United States Patent [19]

Igashira et al.

[11] Patent Number: 4,731,721
[45] Date of Patent: Mar. 15, 1988

[54] REGULATED HIGH-VOLTAGE POWER SUPPLY WITH OUTPUT SHORTING PREVENTION

[75] Inventors: Kiyoteru Igashira; Yukio Maeba, both of Nagaokakyo, Japan

[73] Assignee: Murata Manufacturing Co., Ltd., Japan

[21] Appl. No.: 832,146

[22] Filed: Feb. 24, 1986

[30] Foreign Application Priority Data

Mar. 20, 1985 [JP] Japan .................................. 60-57894

[51] Int. Cl.⁴ ........................................... H02H 7/122
[52] U.S. Cl. ...................................... 363/56; 363/19; 363/131
[58] Field of Search ...................... 363/19, 20, 21, 56, 363/131, 49; 361/75

[56] References Cited

U.S. PATENT DOCUMENTS 3,879,647  4/1975  Hamilton et al. ..................... 363/49

FOREIGN PATENT DOCUMENTS 56-22583  3/1979  Japan .
0132776   7/1984  Japan .
450297    3/1975  U.S.S.R. .

Primary Examiner—Patrick R. Salce
Assistant Examiner—Jeffrey Sterrett
Attorney, Agent, or Firm—Ostrolenk, Faber, Gerb & Soffen

[57] ABSTRACT

A regulated high-voltage power supply comprising a tuned-collector type oscillation circuit (3) having an oscillation transistor (TR4), a control circuit (2) for controlling the base current of the oscillation transistor (TR4), a resistance circuit (4) for supplying the base current to the oscillation transistor (TR4) in response to the output from the control circuit (2) and a protection circuit (5) having a protective transistor (TR3) for partially receiving the output from the resistance circuit (4) to attenuate the output from the control circuit (2) when short-circuiting is caused in the area of a load (RL). The protective transistor (TR3) is made conductive upon short-circuiting in the area of the load (RL). In order to delay the oscillation starting time of the oscillation circuit (3) immediately after releasing of the short-circuiting, provided is a time-constant circuit (51) formed by a delay capacitor (C51) and discharge resistors (R51, R52) for discharging the storage charge of the delay capacitor.

5 Claims, 2 Drawing Figures

REGULATED HIGH-VOLTAGE POWER SUPPLY WITH OUTPUT SHORTING PREVENTION

BACKGROUND OF THE INVENTION

1. Field of the Invention

The present invention relates to a regulated high-voltage power supply which comprises a tuned-collector type oscillation circuit to obtain stabilized high-voltage output by controlling the base current of an oscillation transistor of the oscillation circuit.

2. Description of the Prior Art

FIG. 2 is an electric circuit diagram showing a regulated high-voltage power supply proposed in Japanese Patent Application No. 6182/1983 (Japanese Patent Laying-Open Gazette No. 132776/1984 published on July 30, 1984). Referring to FIG. 2, the high-voltage power supply 10 comprises a tuned-collector/grounded-emitter type oscillation circuit 3 including a regenerative capacitor C2, an oscillation transistor TR4 and the like and a control circuit 2 for controlling the base current of the oscillation transistor TR4. The high-voltage power supply 10 further comprises a resistance circuit 4 for supplying the base current to the oscillation transistor TR4 in response to the output from the control circuit 2 and a protection circuit 5 having a protective transistor TR3 which partially receives the output from the resistance circuit 4 for attenuating the output of the control circuit 2 when the output is short-circuited in the area of a load RL. The resistance circuit 4 includes a first resistance circuit part 41 having high resistance value and a second resistance circuit part 42 including a zener diode ZD. The first resistance circuit part 41 is formed by a plurality of series-connected resistors R3 and R4, the junction P2 between which is connected to the base of the protective transistor TR3 of the protection circuit 5. A negative feedback control circuit 6 is provided for negative feedback of the output from a detecting resistor R9 which is connected to a high-voltage output side as shown by arrows A, thereby to control the operation of the control circuit 2. Reference numeral 7 indicates an output circuit for supplying high-voltage output to the load RL in response to the output from the oscillation circuit 3. Symbol $V_{in}$ indicates an input terminal of a DC power supply and symbol $V_{out}$ indicates an output terminal. As hereinabove described, symbol RL indicates the load connected to the output terminal $V_{out}$.

The oscillation circuit 3 further includes an oscillation stabilizing resistor R7, positive feedback winding L3, a tuning capacitor C3 and primary (low-voltage) winding L1 of a high-voltage transformer T. The first resistance circuit part 41 of the resistance circuit 4 is not primarily adapted to supply the base current to the oscillation transistor TR4, but to form a short-circuit detecting circuit for detecting whether or not the high-voltage output is short-circuited. Therefore, the resistors R3 and R4 are set at high resistance value. The second resistance circuit part 42 of the resistance circuit 4 forms a main base-current network for mainly supplying the said base current, and the resistor R5 thereof is set at low resistance value. The negative feedback control circuit 6 comprises a comparison amplifier AMP. A negative-phase input terminal (−) of the comparison amplifier AMP receives the output from the detecting resistor R9 as shown by arrows A while a positive-phase input terminal (+) thereof receives the output from a reference power supply E1. The output circuit 7 includes secondary (high-voltage) winding L2 of the high-voltage transformer T, a rectifier diode D1, a smoothing capacitor C4 and a spark discharge preventing resistor R8. In addition, a delay capacitor C5 is provided between the junction P2 of the resistors R3 and R4 forming the first resistance circuit part 41 and a grounded point P4 for delaying the rise time of operation voltage Vb of the protective transistor TR3 at the junction P2 with respect to the rise time of output voltage Va from the control circuit 2.

When the power supply circuit is activated in such structure, the negative-phase input terminal (−) of the comparison amplifier AMP in the negative feedback control circuit 6 is at a low input level. Therefore, the output of the negative feedback control circuit 6 rises toward a high level, whereby the output voltage Va at an output point P1 of the control circuit 2 is increased. The rise speed of the operation voltage Vb at the junction P2 is slower than that of the output voltage Va, through the function of the aforementioned delay capacitor C5.

Therefore, the output voltage Va rises to a level for making the zener diode ZD conductive before the operation voltage Vb at the junction P2 is increased to make the protective transistor TR3 conductive. Consequently, the base of the oscillation transistor TR4 is supplied with the base current, whereby the oscillation circuit 3 rapidly enters an oscillating state. Thus, when the oscillation circuit 3 enters a normal oscillating state, the oscillation transistor TR4 is continuously supplied with the base current since the output voltage Va at the output point of the control circuit 2 is set to be higher than the zener voltage of the zener diode ZD. Further, the operation voltage Vb at the junction P2 is set to be lower than the driving voltage for the protective transistor TR3, so that the protective transistor TR3 is not operated.

When the high-voltage output is short-circuited, the oscillation is so attenuated that voltage Vc at a junction P3 between the regenerative capacitor C2 and the oscillation stabilizing resistor R7 is increased, whereby the operation voltage Vb at the junction P2 is also increased. As the result, the protective transistor TR3 is made conductive to decrease the output voltage Va of the control circuit 2. The decreased output voltage Va is set to be lower than the zener voltage Vz of the zener diode ZD. Therefore, the zener diode ZD is made nonconductive and no substantial base current is supplied to the oscillation transistor TR4, whereby the oscillation circuit 3 stops the oscillation. In addition, although a fine or small base current still flows through the first resistance circuit part 41 to the oscillation transistor TR4, the oscillation will not be developed because of the short-circuiting of the high-voltage output. Thus, the power supply 10 is protected against short-circuiting of the high-voltage output.

When the short-circuiting of the high-voltage output is released, the oscillation circuit 3 starts fine oscillation by the fine base current flowing through the first resistance circuit part 41, whereby the voltage Vc of the regenerative capacitor C2 starts lowering and the protective transistor TR3 is made non-conductive. Since the rise speed of the operation voltage Vb at the junction P2 is slower than that of the output voltage Va of the control circuit 2 as hereinabove described, the protective transistor TR3 is not operated thereafter and the zener diode ZD is made conductive. Consequently, the oscillation transistor TR4 is supplied with the required base current, whereby the oscillation circuit 3 smoothly re-starts oscillation, so that the high-voltage power supply 10 may be restored to a state supplying a prescribed high-voltage output.

A description will now be presented of, e.g., an electrostatic copying machine, in which the high-voltage output of the high-voltage power supply 10 is applied to a charging device, and discharged to electrify the surface of a photosensitive drum.

When, for example, the copy papers are jammed in the said copying machine, corona discharge in a normal loaded state may be shifted to spark discharge. When such spark discharge takes place, the protective transistor TR3 is made conductive in a state similar to the aforementioned state in which the output is short-circuited in the area of the load RL and the current supply to the oscillation circuit 3 is substantially cut off, whereby the oscillation is stopped and the high-voltage output discharge is also stopped.

However, so long as spark discharge continues, the output is intermittently short-circuited, and moreover the protective transistor TR3 enters a non-conductive state from a conductive state in a short period of time since the amount of the storage charge in the delay capacitor C5 is small. Therefore, the protective transistor TR3, which was conductive, is made non-conductive immediately, so that current supply to the oscillation circuit 3 is started whereby the oscillation circuit 3 starts oscillation, to again cause spark discharge. Such intermittent operation is repeated within a short period of time, whereby discharge energy per unit time is increased to cause paper burning, leading to danger of fire. Further, such intense discharge may break or damage circuits etc. around the high-voltage power supply 10.

SUMMARY OF THE INVENTION

The present invention has been proposed in consideration of the aforementioned circumstances, and an object thereof is to enable reduction of discharge energy per unit time even if high-voltage output of a high-voltage power supply is discharged.

In order to attain the aforementioned object, the high-voltage power supply according to the present invention comprises a diode for supplying a forward current to the base of a protective transistor and a time-constant circuit formed by a second delay capacitor for delaying the time at which the protective transistor enters a non-conductive state from a conductive state and a discharge resistor for discharging the storage charge of the second delay capacitor.

According to the present invention, provided between the junction of a plurality of resistors forming a first resistance circuit part and a protective transistor are a diode for supplying a forward current to the base of the protective transistor and a time-constant circuit formed by a second delay capacitor for delaying the time at which the protective transistor enters a non-conductive state from a conductive state and discharge resistors for discharging the storage charge of the second delay capacitor, whereby oscillation starting time of an oscillation circuit immediately after releasing of short-circuiting of a load can be delayed. Particularly when the power supply according to the present invention is applied to, e.g., a copying machine, discharge energy per unit time of high-voltage output in spark discharge can be reduced, so that the copying machine has a safety protecting function against paper burning caused by jamming.

These and other objects, features, aspects and advantage of the present invention will become more apparent from the following detailed of a preferred embodiment of the present invention.

DESCRIPTION OF THE PREFERRED EMBODIMENT

Figure 1:
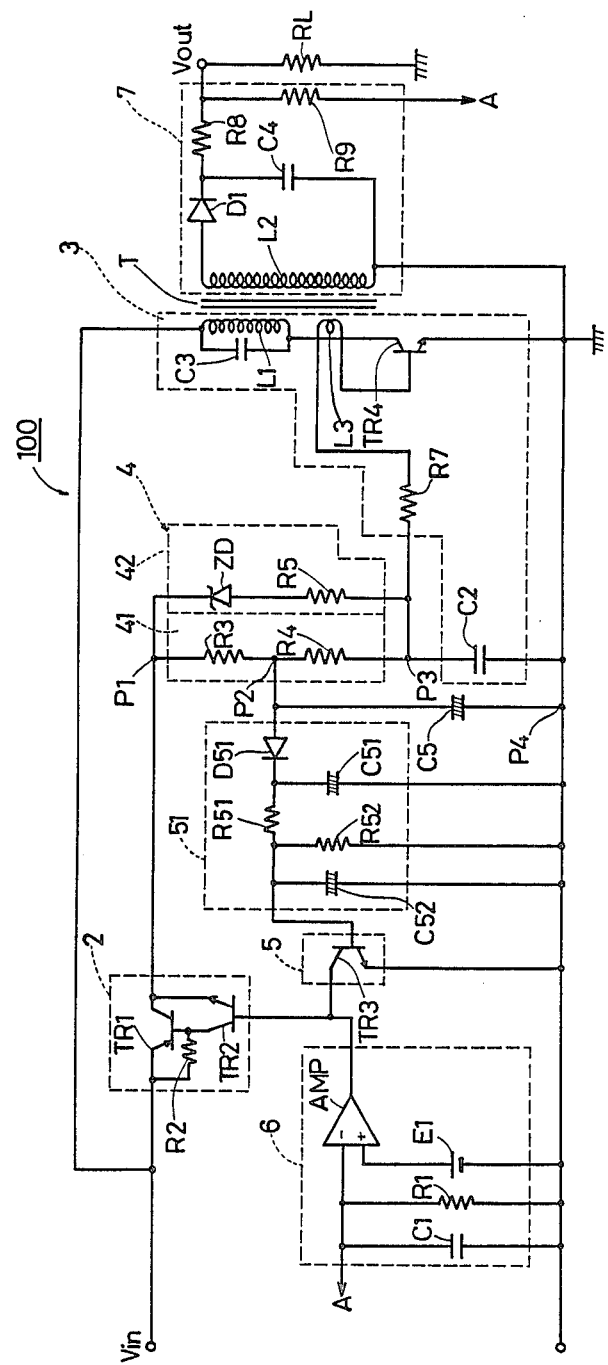
FIG. 1 is an electric circuit diagram showing an embodiment of the present invention.
Figure 2:
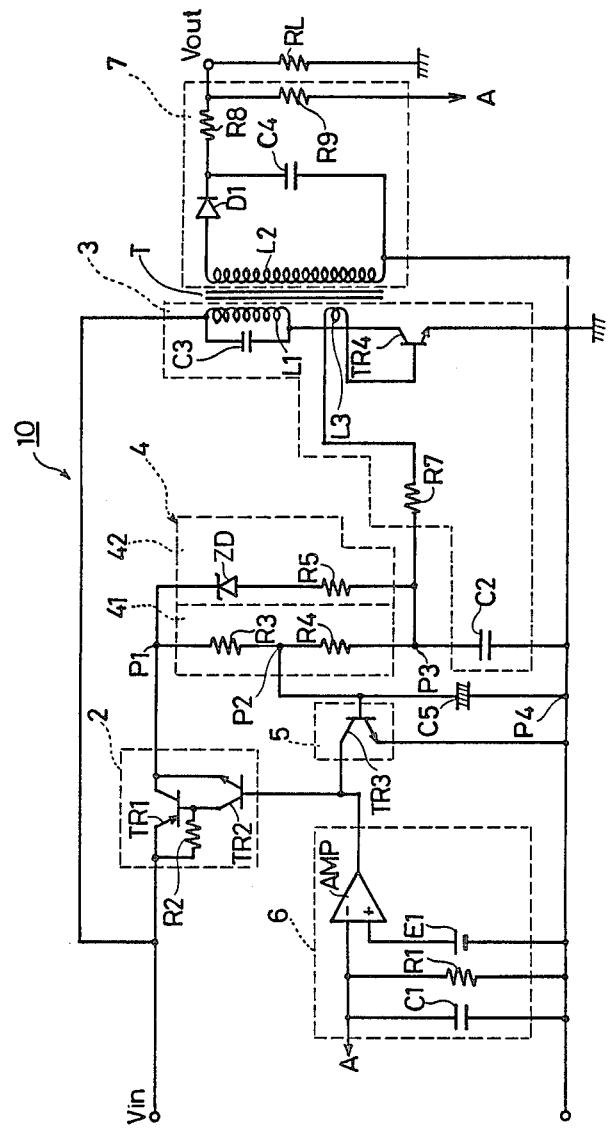
FIG. 2 is an electric circuit diagram showing a prior art stabilized high-voltage power supply.

An embodiment of the present invention is now described in detail with reference to the accompanying drawing. FIG. 1 is an electric circuit diagram showing an embodiment of the present invention. In FIG. 1, elements corresponding to those in FIG. 2 are shown by the same reference numerals.

A high-voltage power supply 100 according to the present invention comprises a tuned-collector/grounded-emitter type oscillation circuit 3 including a regenerative capacitor C2, an oscillation transistor TR4 and the like and a control circuit 2 for controlling the base current of the oscillation circuit 3. The high-voltage power supply 100 further comprises a resistance circuit 4 for supplying the base current to the oscillation transistor TR4 in response to the output from the control circuit 2, a protection circuit 5 having a protective transistor TR3 for partially receiving the output from the resistance circuit 4 to attenuate the output of the control circuit 2 when short-circuiting is caused in the area of a load RL, a time-constant circuit 51 having capacitors C51 and C52, resistors R51 and R52 and a diode D51, a negative feedback control circuit 6 and an output circuit 7.

The resistance circuit 4 includes a first resistance circuit part 41 having high resistance value and a second resistance circuit part 42 including a zener diode ZD. The first resistance circuit part 41 is formed by a plurality of series-connected resistors R3 and R4, the junction P2 between which is connected to the anode of the diode D51 of the time-constant circuit 51 as hereinafter described. The negative feedback control circuit 6 is provided for feedback of the output from a resistor R9 of the output circuit 7 through lines shown by arrows A, thereby to control the operation of the control circuit 2. The output circuit 7 generates high voltage output in response to the output of the oscillation circuit 3, to supply the same to the load RL. An input terminal $V_{in}$ receives voltage from a DC power supply (not shown). The high-voltage output is generated from an output terminal $V_{out}$, which is connected with the load RL.

The oscillation circuit 3 has an oscillation transistor TR4, a regenerative capacitor C2, an oscillation stabilizing resistor R7, positive feedback winding L3, a tuning capacitor C3 and primary (low-voltage) winding L1 of a high-voltage transformer T. The first resistance circuit part 41 in the resistance circuit 4 is not mainly adapted to supply the base current to the oscillation transistor TR4 of the oscillation circuit 3, but to form a short-circuit detecting circuit for detecting whether or not the high-voltage output is short-circuited. Therefore, the resistors R3 and R4 are set at high resistance value. The second resistance circuit part 42 in the resistance circuit 4 is mainly adapted to supply the aforementioned base current, and the resistor R5 is set at low resistance value. The negative feedback control circuit 6 comprises a comparison amplifier AMP. A negative-phase input terminal (−) of the comparison amplifier AMP receives the output from the detecting resistor R9, while a positive-phase input terminal (+) thereof receives the output from a reference power supply E1. The output circuit 7 includes secondary (high-voltage) winding L2 of the high-voltage transformer T, a rectifier diode D1, a smoothing capacitor C4 and a spark discharge preventing resistor R8. In addition, a first delay capacitor C5 is provided between the junction P2 of the resistors R3 and R4 forming the first resistance circuit part 41 and a grounded point P4, so that the rise time of operation voltage Vb for the protective transistor TR3 at the junction P2 is delayed in comparison with that of output voltage Va of the control circuit 2.

Such structure is basically similar to that of the prior art case as shown in FIG. 2, while the power supply according to the present invention is further provided, between the junction P2 of the plurality of resistors R3 and R4 forming the first resistance circuit part 41 and the protective transistor TR3, with the reverse current preventing diode D51 for supplying a forward current to the base of the protective transistor TR3 and the time-constant circuit 51 formed by a second delay capacitor C51 for delaying the time at which the protective transistor TR3 enters a non-conductive state from a conductive state, a bypass capacitor C52 for bypassing induced noise of the high-voltage transformer T etc. and discharge resistors R51 and R52 for providing discharge paths for the storage charge in the second delay capacitor C51.

A description will now be presented of the operation of the circuit according to the preferred embodiment of the present invention. When the power supply circuit 100 is activated, lowered is the level of the input supplied to the negative-phase input terminal of the comparison amplifier AMP of the negative feedback control circuit 6. Therefore, the output of the negative feedback control circuit 6 rises toward a high level, whereby output voltage Va of the output point P1 of the control circuit 2 is increased. The rise speed of the output voltage Va is faster than that of operation voltage Vb at the junction P2. This is because the first delay capacitor C5 is provided between the junction P2 and the grounded potential point P4. Therefore, the output voltage Va at the junction P1 is increased to a level for making the zener diode ZD conductive before the operation voltage Vb at the junction P2 is increased to a prescribed value to make the protective transistor TR3 conductive. As the result, the base of the oscillation transistor TR4 is supplied with the base current, whereby the oscillation circuit 3 enters an oscillating state. When the oscillation circuit 3 thus enters a normal oscillating state, the output voltage Va at the output point P1 of the control circuit 2 is set to be higher than the zener voltage of the zener diode ZD, and hence the base current is continuously supplied to the oscillation transistor TR4. Further, the operation voltage Vb at the junction P2 is set to be lower than the base voltage in the conductive state of the protective transistor TR3 and hence the protective transistor TR3 is not made conductive.

However, when the high-voltage output of the output circuit 7 is short-circuited, the oscillation of the oscillation circuit 3 is attenuated whereby the voltage Vc at the junction P3 between the regenerative capacitor C2 and the oscillation stabilizing resistor R7 is increased, and hence the operation voltage Vb at the junction P2 is also increased. Consequently, a current flows to the diode D51 of the time-constant circuit 51, whereby the protective transistor TR3 is made conductive to decrease the output voltage Va of the control circuit 2. The decreased output voltage Va is set to be lower than the zener voltage Vz of the zener diode ZD. Therefore, the zener diode ZD is made non-conductive and no substantial base current is supplied to the oscillation transistor TR4, whereby the oscillation circuit 3 stops the oscillation. Thus, the power supply circuit 100 is protected against short-circuiting of the high-voltage output.

When the short-circuiting of the high-voltage output is released, the oscillation circuit 3 starts fine oscillation by a fine base current flowing to the first resistance circuit part 41, whereby the voltage Vc of the regenerative capacitor C2 is lowered. Thus, the potential at the junction P2 is also decreased and the diode D51 is made non-conductive. However, the time-constant circuit 51 has a certain discharge time constant determined by the second delay capacitor C51 and the discharge resistors R51 and R52, and hence the transistor TR3 is not made non-conductive immediately after the potential at the junction P2 is decreased. In other words, the transistor TR3 is not made non-conductive until the storage charge in the second delay capacitor C51 is discharged by the discharge resistors R51 and R52 and the base potential of the transistor TR3 returns to a prescribed non-conductive level.

Meanwhile, the diode D51 is for preventing a reverse current from flowing so as to discharge through the junction P2 the storage charge in the second delay capacitor C51. In addition, the first delay capacitor C5 has another function of smoothing the voltage Vb at the junction P2, thereby to stabilize the operation of the protective transistor TR3.

When the transistor TR3 is thus made non-conductive, the aforementioned operation is performed. Namely, the rise speed of the operation voltage Vb at the junction P2 is slower than that of the output voltage Va of the control circuit 2, and hence the protective transistor TR3 is not operated and the zener diode ZD is made conductive. Consequently, the base current is supplied to the oscillation transistor TR4, whereby the oscillation circuit 3 smoothly starts normal oscillation.

The detecting resistor R9 in this embodiment may be replaced by a detecting coil, which is magnetically coupled to the respective windings of the high-voltage transformer T, to provide a negative feedback control circuit of a magnetic feedback system. Further, the constant voltage power supply may be replaced by a constant current power supply or an AC high-voltage output power supply. In case where the time-constant circuit 51 in this embodiment is located at a position appropriately separated from a portion subjected to inductance by the high-voltage transformer T etc., the bypass capacitor C52 may be omitted since no influence by magnetic inductance is exerted on the time-constant circuit 51. Further, the rectifier diode D1 of the output circuit 7 may be connected in a direction reverse to that shown in FIG. 1 so as to supply a negative DC output.

Although an embodiment of the present invention has been described and illustrated in detail, it is clearly understood that the same is by way of illustration and example only and is not to be taken by way of limitation, the scope of the present invention being limited only by the terms of the appended claims.

What is claimed is:

1. A regulated high-voltage power supply comprising
a tuned-collector type oscillation circuit having an oscillation transistor;
a control circuit for controlling the base current of said oscillation transistor;
a resistance circuit for supplying the base current to said oscillation transistor in response to the output from said control circuit;
a protection circuit having a protective transistor for receiving at least part of the output from said resistance circuit to attenuate the output from said control circuit, said resistance circuit being formed by a first resistance circuit part having high resistance value and a second resistance circuit part connected in parallel thereto and including a zener diode, said first resistance circuit part being formed by a plurality of series-connected resistor means, a first junction between said plurality of resistor means being connected to said protective transistor; and
a first delay capacitor connected between said first junction and a grounded potential point for delaying the rise time of voltage at said first junction with respect to the rise time of output voltage of said control circuit,
said regulated high-voltage power supply further including, between said first junction between said plurality of resistor means forming said first resistance circuit part and said protective transistor,
a diode for supplying a forward current to the base of said protective transistor and
a time-constant circuit including a second delay capacitor for delaying the time at which said protective transistor enters a non-conductive state from a conductive state, the diode preventing the storage charge in the second delay capacitor from being discharged through the first resistance circuit part, and
discharge resistor means for discharging the storage charge of said second delay capacitor.

2. A regulated high-voltage power supply in accordance with claim 1, wherein said second delay capacitor and said diode are connected in series between said first junction between said plurality of resistor means and said grounded potential point, said series-connected second delay capacitor and diode being connected in parallel with said first delay capacitor.

3. A regulated high-voltage power supply in accordance with claim 2, wherein discharge resistor means are connected between a second junction between said diode and said second delay capacitor and said grounded potential point.

4. A regulated high-voltage power supply in accordance with claim 3, wherein said discharge resistor means comprises a plurality of resistors which are connected in series so as to define third junction therebetween which is connected directly to said protective transistor.

5. A regulated high-voltage power supply in accordance with claim 4, further comprising a bypass capacitor connected between the third junction and said grounded potential point.

* * * * *